P. H. THOMAS.
MEANS FOR MAINTAINING VAPOR CONVERTERS IN OPERATION.
APPLICATION FILED AUG. 7, 1914.
Reissued Apr. 27, 1915. 13,906.
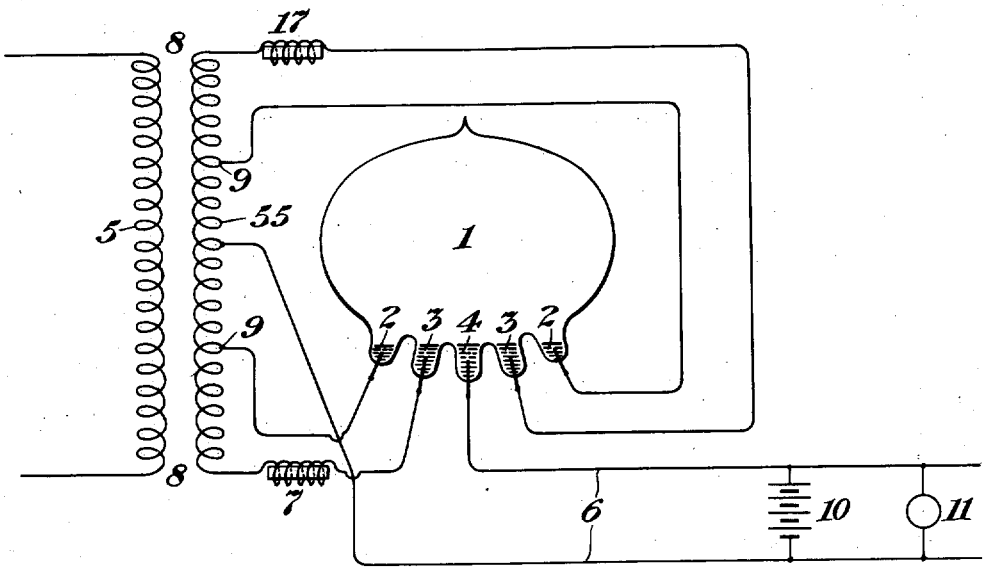
WITNESSES
Chas. J. Clagett
Thos. H. Brown
INVENTOR
Percy H. Thomas
BY
Charles A. Brown
ATTORNEY

UNITED STATES PATENT OFFICE.

PERCY H. THOMAS, OF UPPER MONTCLAIR, NEW JERSEY, ASSIGNOR, BY MESNE ASSIGNMENTS, TO COOPER HEWITT ELECTRIC COMPANY, OF HOBOKEN, NEW JERSEY, A CORPORATION OF NEW JERSEY.

MEANS FOR MAINTAINING VAPOR-CONVERTERS IN OPERATION.

13,906. Specification of Reissued Letters Patent. Reissued Apr. 27, 1915.

Original application filed December 24, 1903, Serial No. 186,488. Divided and application filed October 19, 1904, Serial No. 229,047. Original No. 964,336, dated July 12, 1910. Application for reissue filed August 7, 1914. Serial No. 855,712.

*To all whom it may concern:*

Be it known that I, PERCY H. THOMAS, a citizen of the United States, and resident of Upper Montclair, (formerly of East Orange,) in the county of Essex and State of New Jersey, have invented certain new and useful Improvements in Means for Maintaining Vapor-Converters in Operation, of which the following is a specification.

The present invention relates to means for keeping alive a vapor converter when operated on an alternating current circuit wherein, in the absence of some means for maintaining a flow of current in one direction through the converter, the flow of current would cease.

The invention is especially adapted for use in connection with circuits intended for the charging of storage batteries or for operating motors where comparatively small powers are used. By employing the means herein described there is no waste of current such as takes place to a greater or less extent in keeping converters alive by an inductive shunt circuit or by a small transformer. There may be inductive factors in the load, but these may be dispensed with and in any case they are of little consequence with small powers.

Various devices have been proposed for accomplishing generally the result of keeping vapor converters alive, most of which are at a disadvantage in circuits where a counter-electro-motive-force is to be overcome, or cause a considerable waste of current by shunt circuits, or loss of potential by series inductances.

According to the present invention I provide a vapor converter with two supplemental positive electrodes with largely increased voltage, and place choke coils in the leads of these two positive electrodes. The small alternating current in these choke coils bridges the zero point in the current from the main positive electrode or electrodes, at the same time passing their current through the load.

In respect to the last feature mentioned, the present device differs from most of those which have heretofore been proposed, wherein the energy utilized for keeping the converters alive has been locally applied to the converter itself without supplying current to the work circuit. In the system herein proposed there is no loss of energy due to resistances, the current being controlled by choke coils.

I have illustrated my invention in the accompanying drawing, which is a section of a vapor converter including a diagram of electrical circuits adapted to the carrying out of my invention.

In the drawing, 1 is the container inclosing two main positive electrodes, 2, 2, and the supplementary positive electrodes, 3, 3, and a negative electrode, 4. Alternating current from a suitable source is made to supply the direct current work circuit, 6, through the vapor converter 1 by way of the electrodes 2, 2 and 4, in a manner already well-known, provided the negative electrode resistance is kept from being reëstablished. The source referred to may be a transformer having a primary, 5, connected with the terminals of an alternating current generator, and a secondary, 55, which forms the direct means of connection with the system herein described. The supplementary electrodes 3, 3 are connected through choke coils, 7, 7, with points, 8, 8, of the supply, each having a higher potential than the points, 9, 9, connected with the main positives, 2, 2. In the work circuit I may locate a storage battery, 10, and a translating device, 11, of any suitable character adapted to be operated by current of one direction.

It will be understood that the translating devices included in the work circuit may be any direct current translating devices, although, for convenience of illustration, I have shown one of them as a storage battery, because the charging of a storage battery is not so readily and evenly accomplish by other systems of circuits. The other translating device may be a direct current motor using a small amount of electrical energy.

In the system described, the chief portion of the current supplied to the work circuit is delivered through the positive electrodes 2, 2 the function of the supplementary positives 3, 3 being to maintain a suitable current while the natural zero point of the main supply is being passed. To accomplish this result, an increased or major electro-motive-fore is supplied to the supplementary positive electrodes, which causes current to flow at appropriate times through the work circuit and through the choke coils 7, 7. The magnitude of these choke coils is such as to absorb the major voltage, leaving approximately the voltage of the positive electrodes 2, 2 for the load. By the action of the major electro-motive force, it is possible to store a sufficient quantity of energy in the choke coils during one alteration to maintain the necessary current both through the converter and through the load during the natural zero period of the main supply, and this is true even when a storage battery or other source of counter electro-motive-force is included in the load. By these means it is evident that the load can be put in direct communication with the source of power giving as perfect regulation as the supply system can maintain unhampered by choke coils for carrying the load over the dead points and it is seen also that no current passes through the converter without going through the load, thus reducing the requisite capacity of the apparatus.

Considering a main positive electrode and a corresponding supplemental positive electrode, the function of the increased electro-motive-force which is made to differ in phase from the main electro-motive-force is to so prolong the passage of current through the negative electrode that it shall not become zero until after current has been established from another electrode. This principle can be applied to any number of main and supplemental electrodes although, for convenience, two main and two supplemental positive electrodes have been illustrated and described.

This application is a division of my application Serial Number 186,488, filed on the 24th day of December, 1903.

I claim as my invention:

1. A vapor converter having a plurality of main positive electrodes, a plurality of supplemental positive electrodes, and a common negative electrode, in combination with a source of normal electro-motive-force and connections therefrom to the common negative electrode and the main positive electrodes, a source of increased electro-motive-force, and connections therefrom to the common negative and the supplemental positive electrodes.

2. A vapor converter having a plurality of main positive electrodes, a plurality of supplemental positive electrodes, and a common negative electrode, in combination with a source of normal electro-motive-force and connections therefrom to the common negative and the main positive electrodes, a source of increased electro-motive-force, and connections therefrom to the common negative and the supplemental positive electrodes, an inductance being interposed in each circuit of the source of increased electro-motive-force.

3. In a system of electrical distribution, an alternating current supply circuit and a direct current work circuit including a translating device, in combination with a vapor converter interposed between the described circuits, the said vapor converter being provided with a plurality of main positive electrodes, a plurality of supplemental positive electrodes, and a common negative electrode, the negative electrode being connected to a common terminal of a source of normal electro-motive-force and a source of increased electro-motive-force, and the main and supplemental positive electrodes being connected, respectively, to the opposite terminals of the said sources.

4. In a system of electrical distribution, a direct current work circuit containing a translating device, an alternating current source consisting of a transformer whose secondary is adapted to supply the said work circuit, and connections from the said secondary to the work circuit through a vapor converter having a plurality of main positive electrodes, a plurality of supplemental positive electrodes and a common negative electrode, the said negative electrode being connected to an intermediate point of the secondary, the supplemental positive electrodes being connected to the terminals of the said secondary and the main positive electrodes being connected to the secondary at points intermediate between the point of connection for the negative electrode and the points of connection for the supplemental positive electrodes.

5. In a system of electrical distribution, a direct current work circuit containing a translating device, an alternating current source consisting of a transformer whose secondary is adapted to supply the said work circuit, and connections from the said secondary to the work circuit through a vapor converter having a plurality of main positive electrodes, a plurality of supplemental positive electrodes and a common negative electrode, the said negative electrode being connected to an intermediate point of the secondary, the supplemental positive electrodes being connected to the terminals of the said secondary and the main positive electrodes being connected to the secondary at points intermediate between the point of connection for the negative electrode and the points of connection for the supplemental positive electrodes, and an inductance interposed in each circuit between the supplemental positive electrodes and the terminals of the sources.

6. In a system of electrical distribution, an alternating current supply circuit and a direct current work circuit including a translating device having the capacity of developing counter electro-motive-force, in combination with a vapor converter interposed between the described circuits, the said vapor converter being provided with a plurality of main positive electrodes, a plurality of supplemental positive electrodes, and a common negative electrode, the negative electrode being connected to a common terminal of a source of normal electro-motive-force and a source of increased electro-motive-force, and the main and supplemental positive electrodes being connected, respectively, to the opposite terminals of the said sources.

7. In a system of electrical distribution, a direct current work circuit containing a translating device having the capacity of developing counter electro-motive force, an alternating current source consisting of a transformer whose secondary is adapted to supply the said work circuit, and connections from the said secondary to the work circuit through a vapor converter having a plurality of main positive electrodes, a plurality of supplemental positive electrodes and a common negative electrode, the said negative electrode being connected to an intermediate point of the secondary, the supplemental positive electrodes being connected to the terminals of the said secondary and the main positive electrodes being connected to the secondary at points intermediate between the point of connection for the negative electrode and the points of connection for the supplemental positive electrodes.

8. In a system of electrical distribution, a direct current work circuit containing a translating device having the capacity of developing counter electro-motive force, an alternating current source consisting of a transformer whose secondary is adapted to supply the said work circuit, and connections from the said secondary to the work circuit through a vapor converter, having a plurality of main positive electrodes, a plurality of supplemental positive electrodes and a common negative electrode, the said negative electrode being connected to an intermediate point of the secondary, the supplemental positive electrodes being connected to the terminals of the said secondary and the main positive electrodes being connected to the secondary at points intermediate between the point of connection for the negative electrode and the points of connection for the supplemental positive electrodes, and an inductance interposed in each circuit between the supplemental positive electrodes and the terminals of the sources.

9. In an organization of circuits in which a vapor converter is utilized for transmitting a direct current from an alternating current source to a suitable receiving circuit, means for keeping the converter alive, such means consisting of devices for applying simultaneously to the converter single phase electric currents from a plurality of electrodes, and means for causing a difference in the phases of the currents from simultaneously operating sources to produce a continuous overlapping of the current at the negative electrode.

10. A vapor converter having a plurality of main positive electrodes and a plurality of supplemental positive electrodes and a common negative electrode in combination with a source of normal electromotive force, connections therefrom to the common negative and the main positive electrodes, a source of increased electromotive force, connections therefrom to the common negative and the supplemental positive electrodes, inductances being interposed in a plurality of the connections from the positive electrodes to the sources.

11. A system of electrical distribution including a vapor converter having a main positive electrode, a supplemental positive electrode and a common negative electrode, in combination with a source of normal electromotive force and connections therefrom to the common negative electrode and the main positive electrode, a source of increased electromotive force and a connection therefrom to the common negative electrode and the supplemental positive electrode, together with complementary means for maintaining the negative electrode in operative condition.

12. The combination with a single phase alternating current source, a vacuum rectifier comprising a hermetically sealed and completely exhausted container, a vaporizable reconstructing cathode and a plurality of main and supplemental anodes therein, and a direct current work circuit supplied from said rectifier, of means for passing through said work circuit from said source a plurality of currents respectively through the main and supplemental positive electrodes, the phases of said currents overlapping whereby a continuous flow of current is maintained through said negative electrode.

13. In a system of electrical distribution wherein a direct current work circuit is supplied from an alternating current source through a vacuum rectifier comprising a hermetically sealed and completely exhausted container, a vaporizable reconstructing cathode and suitable anodes therefor, a current path from a terminal of the source through an anode to the work circuit in combination with a shunt path external to the sources from the said terminal to the work circuit, said shunt path including a second anode and a source of electromotive force and a voltage consuming device capable of storing and restoring energy together with complementary means for maintaining the negative electrode in operative condition.

14. In a system of electrical distribution in which a direct current work circuit is supplied from an alternating source through a vacuum rectifier comprising a hermetically sealed and completely exhausted container, a vaporizable reconstructing cathode, and suitable anodes therein, the combination of direct connections for supplying energy from the source to the work circuit through said rectifier in combination with a source of separate electromotive force supplying energy to the work circuit, the last named electromotive force operating through energy storing means, whereby current is passed through the rectifier therefrom at times of zero electromotive force from the supply.

15. In a system of electrical distribution a direct current work circuit including a counter-electromotive force, an alternating current source supplying said work circuit through a vacuum rectifier comprising a hermetically sealed and completely exhausted container, a vaporizable reconstructing cathode and suitable anodes therein, in combination with a source of energy at higher potential than the first named source, and means for storing energy and limiting the flow of current from the last named source and for altering its phase whereby the rectifier is maintained in operating condition.

16. The method of keeping alive a vapor converter, which consists in applying to the converter currents from a source of normal electro-motive-force and in addition thereto applying to the converter currents from an increased electro-motive-force having a phase different from the normal electro-motive-force, so that at stated times current will flow through the converter.

17. In a system of electrical distribution, the method of supplying to a work circuit, including a counter-electromotive force, direct current from an alternating current source, which consists in applying two sets of alternating potential impulses naturally in phase from the supply to the work circuit, altering the phase of the current from one set of alternating impulses to bridge the zero points of the current from the other set and opposing all impulses from the supply tending to pass current in a given direction through the work circuit.

18. The method of keeping alive a vapor converter, which consists in applying to the converter currents from a source of normal electro-motive-force, and also applying to the converter currents from an increased electro-motive-force, and varying the phase of the two electro-motive-forces.

19. The method of keeping alive a vapor converter, which consists in applying to the converter currents from a source of normal electro-motive-force, and also applying to the converter currents from an increased electro-motive-force, and inductively varying the phase of the two electro-motive-forces.

20. In a system of electrical distribution, the method of supplying to a work circuit direct current from an alternating current source, which consists in altering the phase of the higher of two sets of alternating impulses from the supply applied to a counter-electromotive force in the work circuit so that said impulses overlap to produce a minimum potential greater than the counter-electromotive force and opposing the flow of current from the supply through the work circuit in a given direction.

21. In a system of electrical distribution the method of supplying to a work circuit direct current from an alternating current source, which consists in lagging inductively the phase of the higher of two sets of alternating impulses from the supply applied to a counter-electro-motive force in the work circuit so that said impulses overlap to produce a minimum potential greater than the counter-electromotive force and opposing the flow of current from the supply through the work circuit in a given direction.

22. In a system of electrical distribution, the method of rectifying a current from an alternating supply for use in a direct current receiving circuit, which consists in passing current from alternate supply alternations through the work circuit in a given direction, passing current from the remaining supply alternations in this same direction of flow through the work circuit, opposing all current flow in the opposite direction and separably lagging two other sets of current waves naturally in phase with the first in applying them to the work circuit, so that an uninterrupted flow of current is introduced therein.

23. In a system of electrical distribution, the combination with an alternating supply, a direct current work circuit and a vapor rectifier interposed between said supply and said work circuit, of connections between said supply and said rectifier and said work circuit, whereby an unimpeded flow of electrical energy is provided, and a separate keeping alive circuit including said work circuit, fed from said supply.

Signed at New York, in the county of New York and State of New York, this 15 day of July, 1914.

PERCY H. THOMAS.

Witnesses:

H. B. WOODWARD,

GEORGE H. STOCKBRIDGE.